United States Patent
Takahashi et al.

(10) Patent No.: US 10,400,874 B2
(45) Date of Patent: Sep. 3, 2019

(54) TORQUE CONVERTER HAVING TORSIONAL VIBRATION DAMPING DEVICE

(71) Applicant: TOYOTA JIDOSHA KABUSHIKI KAISHA, Toyota-shi (JP)

(72) Inventors: Yuya Takahashi, Susono (JP); Morihiro Matsumoto, Susono (JP); Husahiro Tsukano, Susono (JP); Taiki Nakamura, Susono (JP); Hiroyuki Amano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 346 days.

(21) Appl. No.: 15/451,526

(22) Filed: Mar. 7, 2017

(65) Prior Publication Data
US 2017/0276222 A1  Sep. 28, 2017

(30) Foreign Application Priority Data

Mar. 23, 2016  (JP) .................................. 2016-058306
Oct. 31, 2016  (JP) .................................. 2016-212826

(51) Int. Cl.
| F16H 45/02 | (2006.01) |
| F16H 1/36 | (2006.01) |
| F16F 15/12 | (2006.01) |
| F16F 15/123 | (2006.01) |

(52) U.S. Cl.
CPC ........... *F16H 45/02* (2013.01); *F16F 15/123* (2013.01); *F16F 15/1206* (2013.01); *F16H 1/36* (2013.01); *F16H 2045/0226* (2013.01); *F16H 2045/0268* (2013.01); *F16H 2045/0284* (2013.01)

(58) Field of Classification Search
None
See application file for complete search history.

(56) References Cited

U.S. PATENT DOCUMENTS

| 2005/0133328 A1* | 6/2005 | Masuya ................. B60K 6/387 192/3.3 |
| 2007/0007095 A1* | 1/2007 | Tsukamoto ......... F16D 25/0638 192/3.29 |
| 2007/0056820 A1* | 3/2007 | Degler .................... F16H 45/02 192/3.29 |
| 2007/0251788 A1* | 11/2007 | Heck ....................... F16H 45/02 192/3.3 |
| 2012/0304808 A1* | 12/2012 | Amano ............... F16F 15/1457 74/574.2 |
| 2013/0203541 A1 | 8/2013 | Lorenz et al. |

FOREIGN PATENT DOCUMENTS

| DE | 10 2011 007 118 A1 | 12/2011 |
| JP | 7-208546 A | 8/1995 |
| JP | 2008-163977 | 7/2008 |
| JP | 2010-101380 A | 5/2010 |

\* cited by examiner

*Primary Examiner* — Colby M Hansen
(74) *Attorney, Agent, or Firm* — Oblon, McClelland, Maier & Neustadt, L.L.P.

(57) ABSTRACT

A torque converter that is downsized in an axial direction utilizing existing space is provided. A pump impeller, a turbine runner, a lockup clutch, an elastic damper, and a planetary unit are held in a housing. A torsional vibration damping device is arranged concentrically with the lockup clutch. An input element is arranged concentrically with the lockup clutch while being connected to the lockup clutch and a drive member. An output element is connected to a driven member.

21 Claims, 8 Drawing Sheets

TORQUE CONVERTER HAVING TORSIONAL VIBRATION DAMPING DEVICE

The present invention claims the benefit of Japanese Patent Applications No. 2016-058306 filed on Mar. 23, 2016 and No. 2016-212826 filed on Oct. 31, 2016 with the Japanese Patent Office, the disclosure of which is incorporated herein by reference in its entirety.

BACKGROUND

Field of the Invention

The present invention relates to the art of a torque converter having a damping device that suppresses torsional vibrations caused by torque pulse.

Discussion of the Related Art

JP-A-2008-163977 describes a damper device having a double-pinion planetary gear unit for suppressing torsional vibrations disposed between a lockup clutch and a turbine runner. According to the teachings of JP-A-2008-163977, the planetary gear unit comprises a sun gear, a ring gear arranged around the sun gear, first pinion gears meshing with the sun gear, second pinion gears meshing with the ring gear, and a carrier supporting the first and the second pinion gears. In the planetary gear unit, the ring gear is integrated with a disc connected to an outer circumferential portion of the lockup clutch, and the sun gear is integrated with a plate allowed to rotate relatively to the disc through springs arranged in an inner circumferential side of the planetary gear unit. The ring gear is rotated relatively to the sun gear while compressing the springs by pulsation of input torque. Consequently, torque pulse is dumped by an inertia torque of the carrier.

In the damper device taught by JP-A-2008-163977, specifically, springs are arranged between the ring gear and the sun gear, and a relative rotation between the ring gear and the sun gear is caused by pulsation of the input torque. In this situation, the carrier is rotated compulsory and the pulsation of the input torque is damped by an inertia torque of the carrier. However, the damper device taught by JP-A-2008-163977 may be downsized utilizing existing space.

SUMMARY OF THE INVENTION

The present invention has been conceived noting the foregoing technical problems, and it is therefore an object of the present invention is to provide a torque converter that is downsized in an axial direction utilizing existing space.

The present invention relates to a torque converter having a torsional vibration damping device comprising: a housing in which an internal space thereof is kept to a liquid-tight condition; a pump impeller that creates a spiral flow of fluid; a turbine runner that is rotated by the spiral flow of the fluid; a lockup clutch that is engaged to transmit torque between the housing and the turbine runner; an elastic damper that transmits the torque delivered from the lockup clutch to a drive member to a driven member through an elastic member; and a planetary unit serving as the torsional vibration damping device, in which a first rotary element serves as an input element, a second rotary element serves as an output element, and a third rotary element is vibrated in a rotational direction by a pulsation of the torque transmitted between the first rotary element and the second rotary element. The pump impeller, the turbine runner, the lockup clutch, the elastic damper, and the planetary unit are held in the housing. In order to achieve the above-explained objectives, according to the embodiments of the present application, the torsional vibration damping device is arranged concentrically with the lockup clutch, the input element is arranged concentrically with the lockup clutch while being connected to the lockup clutch and the drive member in a torque transmittable manner, and the output element is connected to the driven member.

In a non-limiting embodiment, the lockup clutch may be connected to the input element through a connection member in a torque transmittable manner between the housing and the torsional vibration damping device in an axial direction, and the output element may be connected to the driven member in a torque transmittable manner.

In a non-limiting embodiment, the lockup clutch may be situated in an inner circumferential side of the torsional vibration damping device.

In a non-limiting embodiment, the lockup clutch may be situated in an outer circumferential side of the torsional vibration damping device.

In a non-limiting embodiment, the elastic damper may be situated between the torsional vibration damping device and the turbine runner in the axial direction.

In a non-limiting embodiment, the lockup clutch may include a plurality of first friction plates connected to the housing, a plurality of second friction plates connected to the turbine runnel; and an actuator that engages the first friction plates with the second friction plates to enable torque transmission between the housing and the turbine runner.

In a non-limiting embodiment, the actuator may be situated in tandem with the first friction plates and the second friction plates in the axial direction.

In a non-limiting embodiment, a single-pinion planetary gear unit comprising a sun gear, a ring gear arrange concentrically with the sun gear, a plurality of first pinion gears interposed between the sun gear and the ring gear, and a carrier supporting the first pinion gears may be used as the torsional vibration damping device. In this case, the ring gear may serve as any one of the input element and the output element, and any one of the sun gear and the carrier may serve as the other of the input element and the output element. In this case, the other of the sun gear and the carrier is vibrated in a rotational direction by a pulsation of the torque transmitted between the input element and the output element.

In the single-pinion planetary gear unit, specifically, the ring gear may serve as the output element, and the sun gear may serve as the input element. In this case, the carrier is vibrated in the rotational direction by a pulsation of the torque transmitted between the sun gear and the ring gear. In addition, the carrier may include a plurality of pairs of first supporting members individually holding the first pinion gear, and a plurality of masses interposed between the sun gear and the ring gear to individually connect the adjacent pairs of first supporting members.

In the single-pinion planetary gear unit, alternatively, the ring gear may serve as the input element, and the sun gear may serve as the output element. In this case, the carrier is vibrated in the rotational direction by a pulsation of the torque transmitted between the sun gear and the ring gear. In addition, the carrier may also include a plurality of pairs of first supporting members individually holding the first pinion gear, and a plurality of masses interposed between the sun gear and the ring gear to individually connect the adjacent pairs of first supporting members.

In a non-limiting embodiment, a double-pinion planetary gear unit comprising a sun gear, a ring gear arrange concentrically with the sun gear, a plurality of first pinion gears meshing with the sun gear, a plurality of second pinion gears interposed between the first pinion gears and the ring gear, and a carrier supporting the first pinion gears and the second pinion gears may also be used as the torsional vibration damping device. In the double-pinion planetary gear unit, any one of the sun gear and the ring gear may serve as the input element, and the other of the sun gear and the ring gear may serve as the output element. In this case, the carrier is vibrated in a rotational direction by a pulsation of the torque transmitted between the input element and the output element.

In the double-pinion planetary gear unit, the carrier may include a plurality of pairs of second supporting members individually holding the first pinion gear and the second pinion gears, and a plurality of masses interposed between the sun gear and the ring gear to individually connect the adjacent pairs of second supporting members.

Thus, according to the embodiments of the present application, the planetary unit is used as the torsional vibration damping device, and in the torque converter, the planetary unit is arranged concentrically with the lockup clutch. According to the embodiments of the present application, therefore, growth in size of the torque converter in the axial direction can be reduced even if the planetary unit is arranged in the torque converter. Specifically, in the planetary unit, the first rotary element is arranged concentrically with the lockup clutch while being connected to the lockup clutch in a torque transmittable manner, and hence an axial length of the torque converter can be reduced. In addition, the first rotary element is connected to the drive member of the elastic damper through the lockup clutch, and the second rotary element is connected to the driven member of the elastic damper. Since the drive member and the driven member are connected to each other through the elastic members, the drive member and the driven member are rotated relatively to each other by pulsation of the torque transmitted to the drive member through the first rotary element. Consequently, the third rotary element is rotated by ab differential action of the planetary unit, and such pulsation of the torque can be damped by an inertia torque of the third rotary element.

In addition, even in the embodiment in which the first rotary element is not arranged concentrically with the lockup clutch, the first rotary element may be connected to the lockup clutch through the connection member.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

First Embodiment

Figure 1:
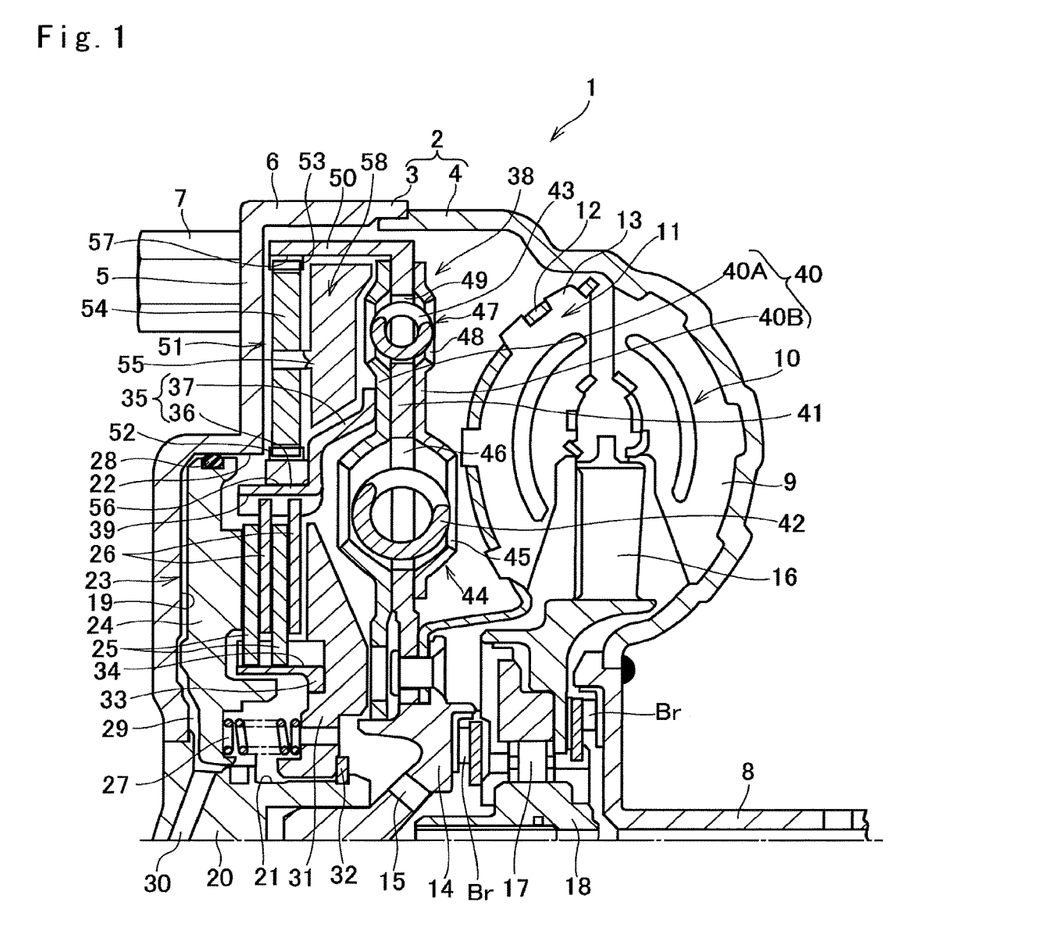
FIG. 1 is a cross-sectional view showing a first embodiment of the torque converter according to the present application.

Preferred embodiments of the present application will now be explained with reference to the accompanying drawings. Turning now to FIG. 1, there is shown the first embodiment of the torque converter having the torsional vibration damping device. A housing 2 of a torque converter 1 comprises a front cover 3 connected to an output shaft of an engine (not shown), and a pump shell 4 joined to the front cover 3. An internal space of the housing 2 is maintained in a liquid-tight condition, and oil is held in the housing 2 to transmit torque. Specifically, the front cover 3 includes a side wall 5 as a disc member and a first cylindrical portion 6 extending in an axial direction from an outer circumferential edge of the side wall 5. A nut 7 to which a drive plate (not shown) is connected is attached to an outer face of the side wall 5. A leading end of the first cylindrical portion is joined to one end of the pump shell 4, and a hollow shaft 8 is formed at the other end of the pump shell 4 to be connected to an oil pump (not shown).

A plurality of pump blades 9 are attached to an inner face of the pump shell 4 to form a pump impeller 10. A turbine runner 11 that is substantially symmetrical with the pump impeller 10 is opposed to the pump impeller 10. Specifically, the turbine runner 11 includes a turbine shell 12, and a plurality of turbine blades 13 attached to an inner face of the turbine runner 11, and the turbine runner 11 is connected to a not shown input shaft of a transmission through a turbine hub 14. In order to supply oil to the housing 2, an oil hole 15 is formed on the turbine hub 14.

A stator 16 is interposed between inner circumferential portions of the pump impeller 10 and the turbine runner 11. Specifically, the stator 16 is connected to a fixed shaft 18 through a one-way clutch 17. For example, when a speed difference between the pump impeller 10 and the turbine runner 11 is small, the oil flowing out of the turbine runner 11 is delivered to the pump impeller 10 while changing a flowing direction. By contrast, when a speed difference between the pump impeller 10 and the turbine runner 11 is large, the oil flowing out of the turbine runner 11 is delivered to the pump impeller 10 without changing the flowing direction while rotating the pump impeller 10. To this end, when a speed difference between the pump impeller 10 and the turbine runner 11 is small, a rotation of the stator 16 is stopped by engaging the one-way clutch 17. By contrast, when a speed difference between the pump impeller 10 and the turbine runner 11 is large, the stator 16 is allowed to rotate by disengaging the one-way clutch 17. The fixed shaft 18 has a hollow structurer, and the input shaft of the transmission is inserted into the fixed shaft 18 in a rotatable manner. The input shaft of the transmission protrudes from a leading end of the fixed shaft 18, and the turbine hub 14 is splined onto a protruding end of the input shaft.

An inner circumferential portion of the front cover 3 is depressed axially outwardly to form an annular depressed portion 19, and a front hub 20 is formed in a central portion of the front cover 3 in such a manner as to protrude axially inwardly. A lockup clutch 23 is interposed between an outer circumferential face 21 of the front hub 20 and an inner circumferential face 22 of the depressed portion 19. Specifically, the lockup clutch 23 is a multiple-plate clutch comprising an annular piston 24, a plurality of first friction plates 25 pushed by the piston 24 in the axial direction, a plurality of second friction plates 26 arranged alternately with the first friction plates 25 to be engaged therewith, and a return spring 27 for isolating the first friction plates 25 away from the second friction plates 26.

Specifically, the piston 24 is disposed between the inner circumferential face 22 of the depressed portion 19 and the outer circumferential face 21 of the front hub 20 while being opposed to the inner face of the side wall 5 of the front cover 3. In order to close a clearance between the inner circumferential face 22 of the depressed portion 19 and an outer circumference of the piston 24, a sealing member 28 is fitted onto the outer circumference of the piston 24. Thus, a hydraulic chamber 29 is formed by the front cover 3 and the piston 24, and the oil is delivered to the hydraulic chamber 29 from the oil pump through an oil passage 30 formed in the front hub 20. That is, the piston 24 and the hydraulic chamber 29 serve as an actuator.

A retainer 31 expanding radially is splined onto the outer circumferential face 21 of the front hub 20 while being fixed by a snap ring 32, and an inner drum 33 is attached concentrically to the retainer 31. The above-mentioned first friction plates 25 are splined to an outer circumferential face 34 of the inner drum 33. An outer drum 35 is arranged concentrically around the inner drum 33. Specifically, the outer drum 35 comprises a cylindrical main part 36 whose axial length is substantially identical to that of the inner drum 33, and a connection part 37 expanding in the axial direction from the main part 36 to connect the main part 36 to a lockup damper 38. That is, the main part 36 is overlapped with the inner drum 33 in the radial direction of the torque converter 1. The above-mentioned second friction plate 26 are splined to an inner circumferential face 39 of the main part 36, and as described, the first friction plates 25 and the second friction plates 26 are arranged alternately with one another in the axial direction. The above-mentioned return spring 27 extends between an inner circumferential portion of the piston 24 and an inner circumferential portion of the retainer 31.

When the oil is delivered to the hydraulic chamber 29, the piston 24 is moved in the axial direction toward the turbine runner 11 while compressing the return spring 27, and the first friction plates 25 and the second friction plates 26 are engaged with one another. Consequently, the lockup clutch 23 is brought into an engagement mode to transmit torque. By contrast, when the oil is discharged from the hydraulic chamber 29, the piston 24 is elastically withdrawn toward the front cover 3 by the return spring 27 to disengage the first friction plates 25 from the second friction plates 26. Consequently, the lockup clutch 23 is brought into a disengagement mode to interrupt torque transmission.

The lockup damper 38 is disposed between the lockup clutch 23 and the turbine runner 11. Specifically, the lockup damper 38 comprises a drive member 40 rotated integrally with the lockup clutch 23, a driven member 41 opposed to the drive member 40 while being allowed to rotate relatively to the drive member 40, a plurality of first coil springs 42 compressed and expanded in the circumferential direction, and a plurality of second coil springs 43 compressed and expanded in the circumferential direction. According to the first embodiment, the drive member 40 includes a first drive member 40A disposed between the lockup clutch 23 and the driven member 41, and a second drive member 40B disposed between the driven member 41 and the turbine runner 11. The first drive member 40A and the second drive member 40B are connected to each other to be rotated integrally, and the first drive member 40A is also connected to the connection part 37 of the outer drum 35.

A plurality of first spring holders 44 for holding the first coil springs 42 are formed in the lockup damper 38 in a circular manner at regular intervals. Specifically, each of the first spring holder 44 includes first apertures 45 formed on the first drive member 40A and the second drive member 40B, and a second aperture 46 substantially congruent with the first aperture 45 formed on the driven member 41. In each of the first spring holder 44, one of end portions of the first coil spring 42 is contacted to one of circumferential end walls of the first spring holder 44, and the other end portion of the first coil spring 42 is contacted to the other circumferential end wall of the first spring holder 44.

A plurality of second spring holders 47 for holding the second coil springs 43 are also formed in the lockup damper 38 in an outer circumferential side of the first spring holders 44 and in a circular manner at regular intervals. Specifically, each of the second spring holder 47 includes third apertures 48 formed on the first drive member 40A and the second drive member 40B, and a fourth aperture 49 substantially congruent with the third aperture 48 formed on the driven member 41. Here, a spring constant of each of the second coil spring 43 is individually larger than that of the first coil spring 42. In each of the second spring holder 47, one of end portions of the second coil spring 43 is contacted to one of circumferential end walls of the second spring holder 47, and the other end portion of the second coil spring 43 is contacted to the other circumferential end wall of the second spring holder 47. When a torque is applied to the drive member 40, the first drive member 40A and the second drive member 40B are rotated relatively to the driven member 41 while compressing the first coil springs 42 and the second coil springs 43. In this situation, the first coil springs 42 and the second coil springs 43 as elastic members are further compressed by torque pulse to absorb the torque pulse. Optionally, the lockup damper 38 may also be adapted to compress the second coil springs 43 after the first drive member 40A and the second drive member 40B are rotated relatively to the driven member 41 at a predetermined angle.

Specifically, the driven member 41 is an annular member, and an inner circumferential portion of the driven member 41 is fixed to the turbine hub 14 by a rivet. An outer circumferential portion of the driven member 41 is bent toward the front cover 3 to form a second cylindrical portion 50 extending in the axial direction while keeping a slight clearance from the first cylindrical portion 6. Thus, the internal space of the housing 2 is divided into two spaces by the lockup damper 38.

A planetary unit 51 serving as a torsional vibration damping device is arranged in an outer circumferential side of the lockup clutch 23. In other words, the planetary unit 51 is arranged concentrically with the lockup clutch 23 while being overlapped with the lockup clutch 23 at least partially in the radial direction. That is, the planetary unit 51 is arranged adjacent to the lockup damper 38 in the axial direction. Specifically, the planetary unit 51 is a single-pinion planetary unit comprising: a sun gear 52 fitted onto an outer circumferential face 56 of the main part 36 of the outer drum 35; a ring gear 53 formed on an inner circumferential face 57 of the second cylindrical portion 50 concentrically around the sun gear 52; a plurality of pinion gears 54 (also referred to as the "first pinion gears") interposed between the sun gear 52 and the ring gear 53; and a carrier 55 supporting the pinion gears 54 in a rotatable manner.

In order to increase a mass of the carrier 55, an inertial mass 58 is formed integrally with the carrier 55 in a space enclosed by the planetary unit 51, the lockup damper 38 and the second cylindrical portion 50. Alternatively, the inertial mass 58 may also be formed separately and attached to the carrier 55 by an appropriate measure. In addition, a bearing Br is interposed between the turbine hub 14 and the one-way clutch 17.

According to the first embodiment, the outer drum 35 serves not only as an output member of the lockup clutch 23 but also as a torque transmitting member for transmitting engine torque to an input element of the planetary unit 51 and to the lockup damper 38. In addition, the second cylindrical portion 50 connects an output element of the planetary unit 51 to a not shown transmission. In the torque converter 1, when the lockup clutch 23 is engaged, torque is applied to the sun gear 52 through the lockup clutch 23. Accordingly, the sun gear 52 as a first rotary element of the planetary unit 51 serves as an input element of the planetary unit 51. The ring gear 53 as a second rotary element of the planetary unit 51 is connected to the driven member 41 of the lockup damper 38 through the second cylindrical portion 50. Accordingly, the ring gear 53 serves as an output element of the planetary unit 51. The first carrier 55 as a third rotary element of the planetary unit 51 is rotated as a result of relative rotation between the sun gear 52 and the ring gear 53 caused by pulsation of input torque to the sun gear 52.

Next, an action of the torque converter 1 according to the first embodiment will be explained hereinafter. When the lockup clutch 23 is engaged, torque of the not-shown engine is applied to the lockup damper 38. In this situation, a reaction of torque rotating the not-shown transmission is applied to the ring gear 53. Consequently, the first coil springs 42 and the second coil springs 43 of the lockup damper 38 are compressed by a relative rotation between the drive member 40 and the driven member 41, thereby causing a relative rotation between the sun gear 52 and the ring gear 53 at a predetermined angle. In this situation, if the engine torque is stable without causing pulsation, the planetary unit 51 is rotated integrally while maintaining such relative rotation between the sun gear 52 and the ring gear 53.

When pulsation of the input torque to the torque converter 1 occurs, a compressive force (i.e., torsional force) compressing the first coil springs 42 and the second coil springs 43 is changed thereby vibrating the sun gear 52 and the ring gear 53 being rotated relatively to each other. Consequently, the pinion gears 54 are oscillated within a predetermined angle thereby vibrating the carrier 55 in the rotational direction. In this situation, since the carrier 55 is provided with the inertial mass 58, the pulsation of input torque is absorbed by an inertial torque of the carrier 55 governed by a total mass (i.e., an inertia moment) of the carrier 55 and the inertial mass 58 and a rotational angular velocity thereof. As a result, vibrations on the input shaft of the transmission are damped.

As described, according to the first embodiment, the multiple-plate clutch is used as the lockup clutch 23. For this reason, an outer diameter of the lockup clutch 23 is reduced so that the planetary unit 51 can be arranged in an outer circumferential side of the lockup clutch 23 in the radial direction of the torque converter 1. In addition, since the sun gear 52 is integrated with the outer drum 35 and the ring gear 53 is integrated with the second cylindrical portion 50, growth in size of the torque converter 1 can be reduced even if the planetary unit 51 is arranged in the outer circumferential side of the lockup clutch 23. Further, since the outer drum 35 and the first drive member 40A of the lockup damper 38 are adjacent to each other in the axial direction, an increase in the axial length of the torque converter can be reduced.

As also described, the internal space of the housing 2 is divided into two spaces by the lockup damper 38. According to the first embodiment, therefore, a spiral flow of the oil from the pump impeller 10 to the carrier 55 can be blocked. That is, the carrier 55 and the inertial mass 58 can be prevented from being pushed by the spiral flow of the oil from the pump impeller 10. For this reason, a resistance between the carrier 55 and the pinion gear 54 can be reduced to rotate the carrier 55 smoothly. Thus, according to the first embodiment, the torque converter 1 can be prevented to be enlarged even if the planetary unit 51 is arranged therein, and vibration damping performance of the planetary unit 51 can be enhanced.

In addition, the planetary unit 51 may be dismounted easily from the torque converter 1 according to need. Further, since the sun gear 52 is integrated with the outer drum 35 and the ring gear 53 is integrated with the second cylindrical portion 50, number of parts can be reduced to save a manufacturing cost of the torque converter 1.

Second Embodiment

Figure 2:
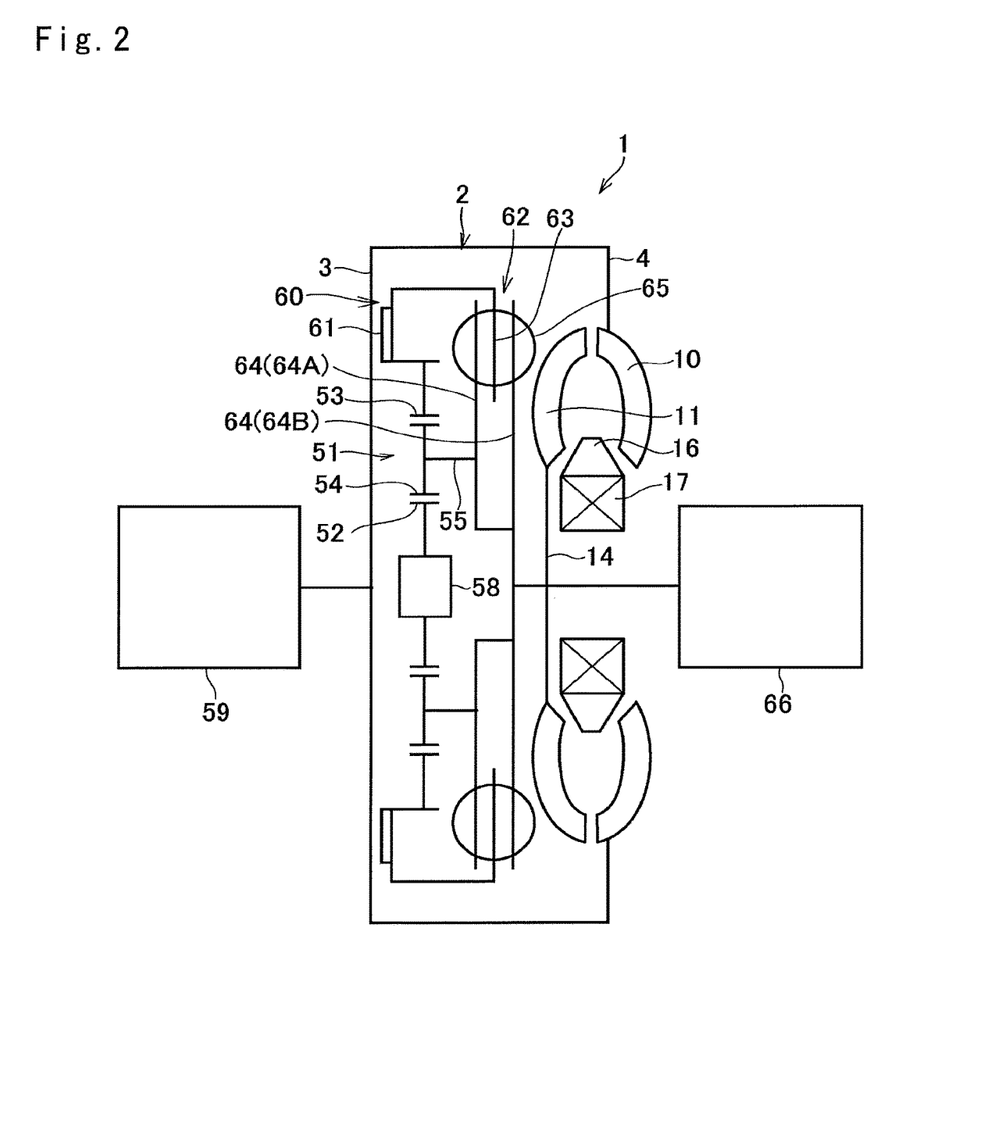
FIG. 2 is a schematic illustration showing a second embodiment of the torque converter according to the present application.

Turning to FIG. 2, there is shown the second embodiment of the torque converter according to the present application. According to the second embodiment, the torque converter 1 is connected to an output shat of an engine 59, and a lockup clutch 60 is opposed to the inner face of the front cover 3 as a part of the housing 2. Specifically, the lockup clutch 60 is a single-plate clutch including an annular piston 61 that is brought into contact to the front cover 3 and isolated away from the front cover 3 depending on a pressure difference between the front cover 3 side and a lockup damper 62 side. Here, the above-mentioned multiple-plate clutch may also be used as the lockup clutch 60. According to the second embodiment, the planetary unit 51 is arranged in an inner circumferential side of the lockup clutch 60, and the lockup damper 62 is disposed between the lockup clutch 60 and the turbine runner 11.

The lockup damper 62 comprises a drive member 63 rotated integrally with the lockup clutch 60, a driven member 64 opposed to the drive member 63 while being allowed to rotate relatively to the drive member 63, and a plurality of springs 65 held in apertures formed in the drive member 63 and the driven member 64. The springs 65 are compressed and expanded in the circumferential direction by a relative rotation between the drive member 63 and the driven member 64. An outer circumferential portion of the drive member 63 is bent toward the front cover 3 to be connected to an outer circumferential portion of the lockup piston 61 in a torque transmittable manner. An inner circumferential portion of the lockup piston 61 is connected to the ring gear 53 of the planetary unit 51 in a torque transmittable manner. The driven member 64 includes a first driven member 64A disposed between the lockup clutch 60 and the drive member 63, and a second driven member 64B disposed between the drive member 63 and the turbine runner 11. The first drive member 64A and the second drive member 64B are connected to each other to be rotated integrally, and also connected to a transmission 66 through the turbine hub 14. The first drive member 64A is also connected to the carrier 55 of the planetary unit 51, and the sun gear 52 is formed integrally with the inertial mass 58. The remaining structures are similar to those of the torque converter 1 shown in FIG. 1, and detailed explanations for the common elements will be omitted by allotting common reference numerals thereto.

When the lockup clutch 60 is engaged, torque of the engine 59 is applied to the lockup damper 62. In this situation, a reaction of torque rotating the transmission 66 is applied to the carrier 55. Consequently, the springs 65 of the lockup damper 62 are compressed by a relative rotation between the drive member 63 and the driven member 64, thereby causing a relative rotation between the ring gear 53 and the carrier 55 at a predetermined angle. In this situation, if an output torque of the engine 59 is stable without causing pulsation, the planetary unit 51 is rotated integrally while maintaining such relative rotation between the ring gear 53 and the carrier 55.

When pulsation of the output torque of the engine 59 occurs, a compressive force compressing the springs 65 is changed thereby vibrating the ring gear 53 and the carrier 55 being rotated relatively to each other. Consequently, the pinion gears 54 are oscillated within a predetermined angle thereby vibrating the sun gear 52 in the rotational direction. In this situation, since the sun gear 52 is provided with the inertial mass 58, the pulsation of input torque is absorbed by an inertial torque of the sun gear 52 governed by a total mass (i.e., an inertia moment) of the sun gear 52 and the inertial mass 58 and a rotational angular velocity thereof. As a result, vibrations on the input shaft of the transmission 66 are damped. According to the second embodiment, the lockup clutch 60 and the planetary unit 51 may also be arranged concentrically with each other utilizing the internal space of the housing 2. In addition, the spiral flow of the oil from the pump impeller 10 to the carrier 55 can be blocked by the lockup damper 62. According to the second embodiment, therefore, the sun gear 52 is allowed to rotate smoothly to enhance the vibration damping performance of the planetary unit 51.

Third Embodiment

Figure 3:
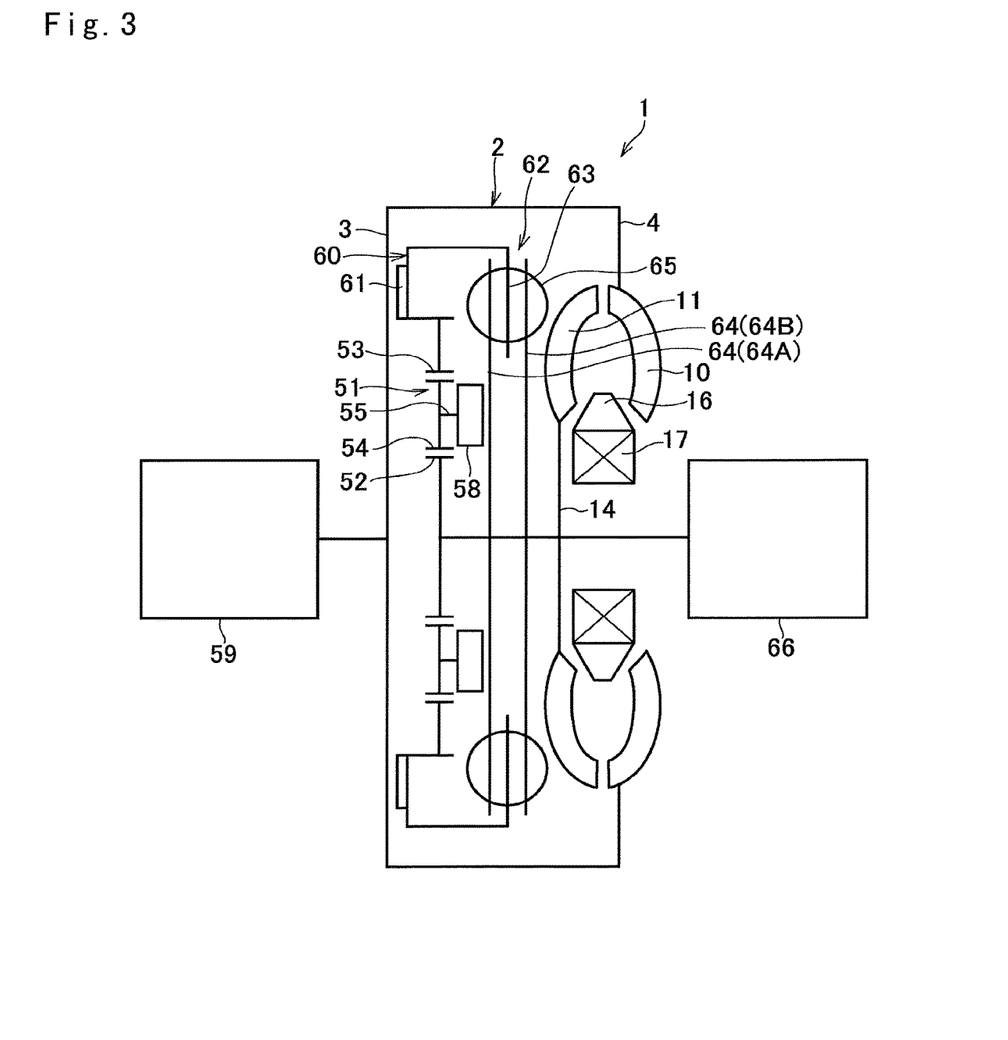
FIG. 3 is a schematic illustration showing a third embodiment of the torque converter according to the present application.

Turning to FIG. 3, there is shown the third embodiment of the torque converter as a modification of the second embodiment. According to the third embodiment, in the planetary unit 51, the ring gear 53 serves as an input element, the sun gear 52 serves as an output element, and the carrier 55 is formed integrally with the inertial mass 58. Specifically, the ring gear 53 is connected to an inner circumferential portion of the lockup piston 61, and the sun gear 52 is connected to the first driven member 64A and the second drive member 64B. The inertial mass 58 is disposed between the planetary unit 51 and the lockup damper 62 in the axial direction of the torque converter 1. The remaining structures are similar to those of the torque converter 1 shown in FIG. 2, and detailed explanations for the common elements will be omitted by allotting common reference numerals thereto.

When the lockup clutch 60 is engaged, the torque of the engine 59 is applied to the lockup damper 62. In this situation, a reaction of torque rotating the transmission 66 is applied to the sun gear 52. Consequently, the springs 65 of the lockup damper 62 are compressed by a relative rotation between the drive member 63 and the driven member 64, thereby causing a relative rotation between the ring gear 53 and the sun gear 52 at a predetermined angle. In this situation, if an output torque of the engine 59 is stable without causing pulsation, the planetary unit 51 is rotated integrally while maintaining such relative rotation between the ring gear 53 and the sun gear 52.

When pulsation of the output torque of the engine 59 occurs, a compressive force compressing the springs 65 is changed thereby vibrating the ring gear 53 and the sun gear 52 being rotated relatively to each other. Consequently, the pinion gears 54 are oscillated within a predetermined angle thereby vibrating the carrier 55 in the rotational direction. In this situation, since the carrier 55 is provided with the inertial mass 58, the pulsation of input torque is absorbed by an inertial torque of the carrier 55 governed by a total mass (i.e., an inertia moment) of the carrier 55 and the inertial mass 58 and a rotational angular velocity thereof. As a result, vibrations on the input shaft of the transmission 66 are damped. According to the third embodiment, the lockup clutch 60 and the planetary unit 51 may also be arranged concentrically with each other utilizing the internal space of the housing 2. In addition, the spiral flow of the oil from the pump impeller 10 to the carrier 55 can be blocked by the lockup damper 62. According to the third embodiment, therefore, the carrier 55 and the inertial mass 58 can be prevented from being pushed by the spiral flow of the oil from the pump impeller 10. For this reason, a resistance between the carrier 55 and the pinion gear 54 can be reduced to rotate the carrier 55 smoothly so that the vibration damping performance of the planetary unit 51 can be enhanced.

Fourth Embodiment

Figure 4:
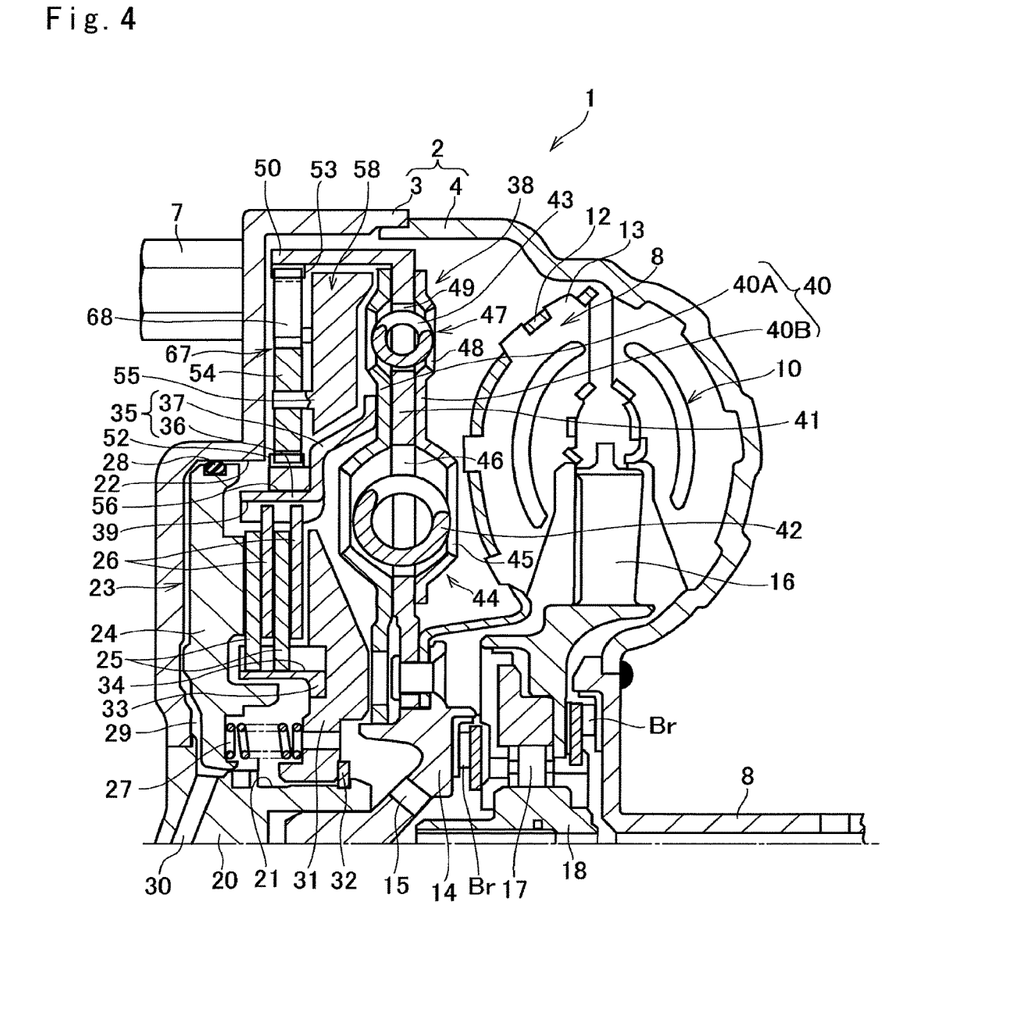
FIG. 4 is a cross-sectional view showing a fourth embodiment of the torque converter according to the present application.

Turning to FIG. 4, there is shown the fourth embodiment of the torque converter as a modification of the first embodiment. According to the fourth embodiment, a double-pinion planetary unit 67 is used in the torque converter 1 instead of the single-pinion planetary unit 51. Specifically, the planetary unit 67 is also arranged in an outer circumferential side of the lockup clutch 23. In other words, the planetary unit 51 is arranged concentrically with the lockup clutch 23. The planetary unit 67 comprises: the sun gear 52 formed on an outer circumferential face of the main part 36 of the outer drum 35; the ring gear 53 formed on an inner circumferential face of the second cylindrical portion 50 concentrically around the sun gear 52; a plurality of the first pinion gears 54 meshing with the sun gear 52; a plurality of second pinion gears 68 interposed between the first pinion gears 54 and the ring gear 53; and the carrier 55 supporting the first pinion gears 54 and the second pinion gears 68 in a rotatable manner. According to the fourth embodiment, the inertial mass 58 is formed integrally with the carrier 55 in a space enclosed by the planetary unit 67, the lockup damper 38 and the second cylindrical portion 50. The remaining structures are similar to those of the torque converter 1 shown in FIG. 1, and detailed explanations for the common elements will be omitted by allotting common reference numerals thereto. In the planetary unit 67, the sun gear 52 is a first rotary element serving as an input element, the ring gear 53 is a second rotary element serving as an output element, and the carrier 55 is a third rotary element.

Rotational speeds of the rotary elements of the planetary unit 67 according to the fourth embodiment can be expressed by the flowing expression (1):

$$(1-\rho)Nc = Nr - \rho Ns$$

where "ρ" is a gear ratio of the planetary unit 67 (teeth number of the sun gear 52/teeth number of the ring gear 53), "Nc" is a rotational speed of the carrier 55, "Nr" is a rotational speed of the ring gear 53, and "Ns" is a rotational speed of the sun gear 52. As described, the sun gear 52 serves as the input element of the planetary unit 67. Specifically, a rotational speed Nc of the carrier 55 with respect to a rotational speed Ns of the sun gear 52 as the input element can be expressed by the flowing expression (2):

$$Nc = (1/(1-\rho)) \cdot Nr.$$

As can be seen from the expression (2), the rotational speed Nc of the carrier 55 is increased higher than the rotational speed Nr of the ring gear 53 as expressed as Nc>Nr. Likewise, a torque Tr of the ring gear 53 and a torque Tc of the carrier 55 can be expressed by the flowing expression (3):

$$Tr = (1/(1-\rho)) \cdot Tc.$$

That is, since the rotational speed Nc of the carrier 55 is increased higher than the rotational speed Nr of the ring gear 53, an inertia torque of the carrier 55 is increased.

When the lockup clutch 23 is engaged, torque of the engine (not shown) is applied to the lockup damper 38. In this situation, a reaction of torque rotating the transmission (not shown) is applied to the ring gear 53. Consequently, the first coil springs 42 and the second coil springs 43 of the lockup damper 38 are compressed by a relative rotation between the drive member 40 and the driven member 41, thereby causing a relative rotation between the sun gear 52 and the ring gear 53 at a predetermined angle. In this situation, if the engine torque is stable without causing pulsation, the planetary unit 67 is rotated integrally while maintaining such relative rotation between the sun gear 52 and the ring gear 53.

When pulsation of the input torque to the torque converter 1 occurs, a compressive force (i.e., torsional force) compressing the first coil springs 42 and the second coil springs 43 is changed thereby vibrating the sun gear 52 and the ring gear 53 being rotated relatively to each other. Consequently, the first pinion gears 54 and the second pinion gears 68 are oscillated within a predetermined angle thereby vibrating the carrier 55 in the rotational direction. As described, the rotational speed Nc of the carrier 55 is increased higher than the rotational speed Nr of the ring gear 53. In this situation, since the carrier 55 is provided with the inertial mass 58, the pulsation of the input torque is absorbed by an inertial torque of the carrier 55 governed by a total mass of the carrier 55 and the inertial mass 58 and a rotational angular velocity thereof. That is, vibrations on the ring gear 53 are damped by the inertia torque of the carrier 55 to suppress vibrations on the input shaft of the transmission. Thus, according to the fourth embodiment, the rotational speed Nc of the carrier 55 can be increased higher than the rotational speed Nr of the ring gear 53 to increase the inertia torque of the carrier 55. For this reason, vibration damping performance of the planetary unit 67 can be enhanced. In addition, according to the fourth embodiment, the lockup clutch 60 and the planetary unit 67 may also be arranged concentrically with each other utilizing the internal space of the housing 2. Further, the spiral flow of the oil from the pump impeller 10 to the carrier 55 may also be blocked by the lockup damper 62.

According to the fourth embodiment, therefore, the carrier 55 is allowed to rotate smoothly to further enhance the vibration damping performance of the planetary unit 67.

Fifth Embodiment

Figure 5:
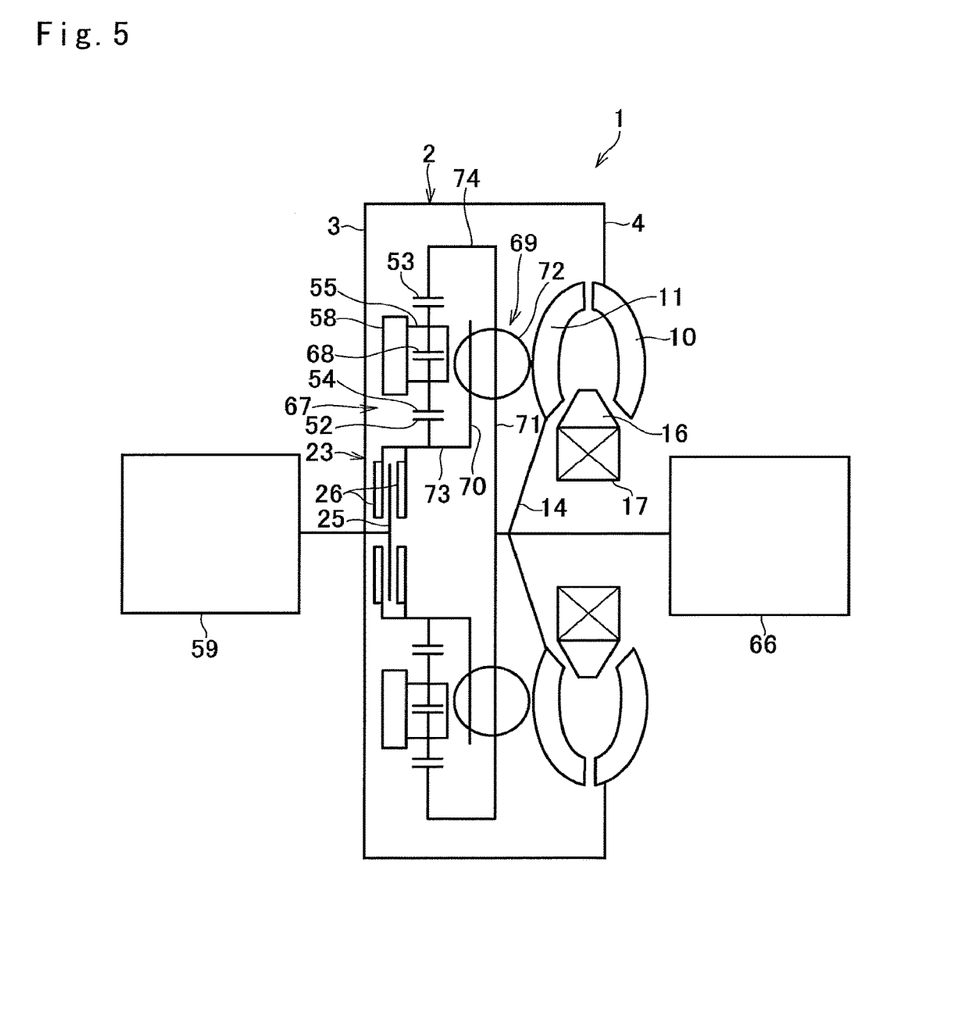
FIG. 5 is a schematic illustration showing a fifth embodiment of the torque converter according to the present application.

Turning to FIG. 5, there is shown the fifth embodiment of the torque converter as a modification of the fourth embodiment in which the inertial mass 38 is disposed between the front cover 3 and the planetary unit 67. According to the fifth embodiment, a lockup damper 69 comprises a drive member 70 rotated integrally with the lockup clutch 23, a driven member 71 opposed to the drive member 70 while being allowed to rotate relatively to the drive member 70, and a plurality of springs 72 held in apertures formed in the drive member 70 and the driven member 71. The springs 72 are compressed in the apertures in the circumferential direction by a relative rotation between the drive member 70 and the driven member 71. The drive member 70 is connected to the output member of the lockup clutch 23 through a first connection member 73 that is connected to the sun gear 52 of the planetary unit 67. Specifically, the first connection member 73 is a cylindrical member extending in the axial direction. An inner circumferential portion of the first connection member 73 is connected to the output member of the lockup clutch 23, and an outer circumferential portion of the first connection member 73 is connected to the sun gear 52 and the drive member 70. The ring gear 53 of the planetary unit 67 is connected to one end of a second connection member 74 that is also a cylindrical member extending in the axial direction, and the other end of the second connection member 74 is connected to the driven member 71. The inertial mass 58 is formed integrally with the carrier 55 to be situated between the front cover 3 and the carrier 55 in the axial direction. The remaining structures are similar to those of the torque converter 1 shown in FIG. 4, and detailed explanations for the common elements will be omitted by allotting common reference numerals thereto.

When the lockup clutch 23 is engaged, torque of the engine 59 is applied to the lockup damper 69. In this situation, a reaction of torque rotating the transmission 66 is applied to the ring gear 53. Consequently, the springs 72 of the lockup damper 69 are compressed by a relative rotation between the drive member 70 and the driven member 71, thereby causing a relative rotation between the sun gear 52 and the ring gear 53 at a predetermined angle. In this situation, if the torque of the engine 59 is stable without causing pulsation, the planetary unit 67 is rotated integrally while maintaining such relative rotation between the sun gear 52 and the ring gear 53.

When pulsation of the torque of the engine 59 occurs, a compressive force compressing the springs 72 is changed thereby vibrating the sun gear 52 and the ring gear 53 being rotated relatively to each other. Consequently, the first pinion gears 54 and the second pinion gears 68 are oscillated within a predetermined angle thereby vibrating the carrier 55 in the rotational direction. As described, an inertia torque is generated in accordance with a total mass of the carrier 55 and the inertial mass 58 and a rotational angular velocity thereof. In addition, the rotational speed Nc of the carrier 55 is increased higher than the rotational speed Nr of the ring gear 53 so that the inertia torque of the carrier 55 can be increased. Consequently, pulsation of the input torque is absorbed by the inertial torque of the carrier 55 to suppress vibrations on the input shaft of the transmission 66.

In addition, according to the fifth embodiment, the inertial mass 58 is situated adjacent to the front cover 3, and the lockup damper 69 is disposed between the planetary unit 67 and the turbine runner 11. According to the fifth embodiment, therefore, the spiral flow of the oil from the pump impeller 10 to the carrier 55 may also be blocked by the lockup damper 69. For this reason, the carrier 55 may also be allowed to rotate smoothly to further enhance the vibration damping performance of the planetary unit 67.

Sixth Embodiment

Figure 6:
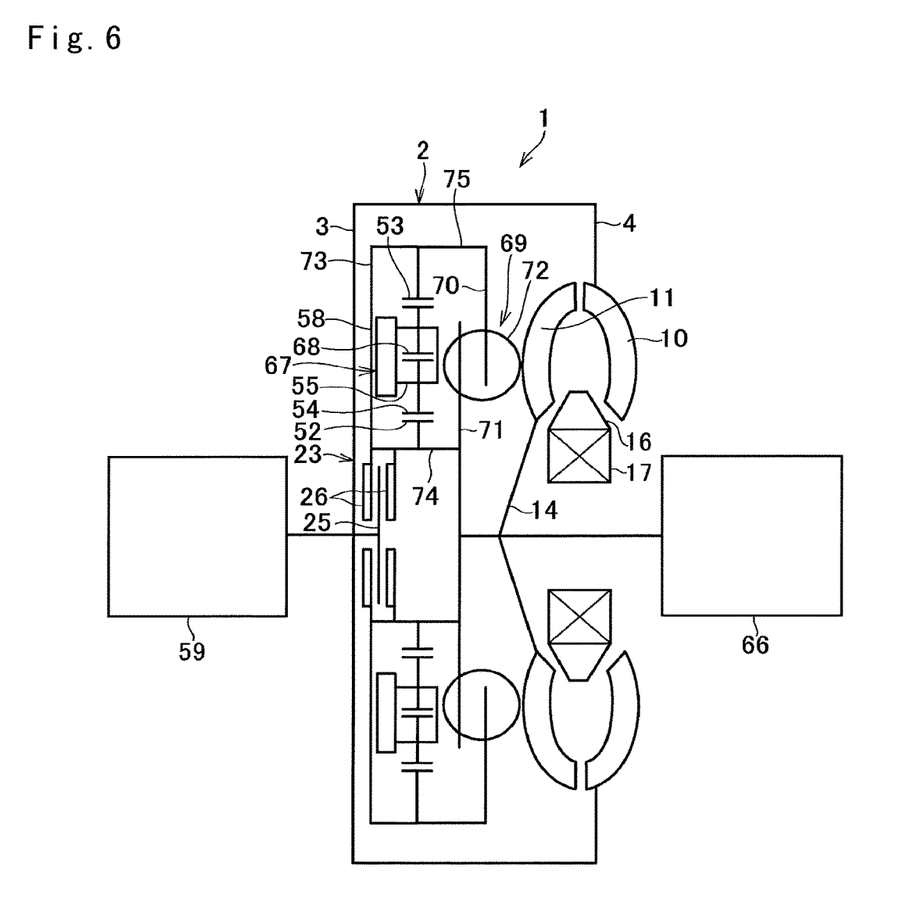
FIG. 6 is a schematic illustration showing a sixth embodiment of the torque converter according to the present application.

Turning to FIG. 6, there is shown the sixth embodiment of the torque converter as a modification of the fifth embodiment. According to the sixth embodiment, in the planetary unit 67, the ring gear 53 serves as an input element, the sun gear 52 serves as an output element, and the carrier 55 is formed integrally with the inertial mass 58. Specifically, the first connection member 73 is shaped into an annular member, and situated adjacent to the casing 3. An inner circumferential portion of the first connection member 73 is connected to the output member of the lockup clutch 23, and an outer circumferential portion of the first connection member 73 is bent toward the turbine runner 11 to form a third cylindrical portion 75. The third cylindrical portion 75 is connected to the ring gear 53 and the drive member 70 of the lockup damper 69. The sun gear 52 is connected to the driven member 71 of the lockup damper 69 through the second connection member 74, and the inertial mass 58 is formed integrally with the carrier 55 to be situated between the first connection member 73 and the planetary unit 67 in the axial direction. The remaining structures are similar to those of the torque converter 1 shown in FIG. 5, and detailed explanations for the common elements will be omitted by allotting common reference numerals thereto.

Rotational speeds of the rotary elements of the planetary unit 67 according to the sixth embodiment will be explained hereinafter. As described, according to the sixth embodiment, the ring gear 53 serves as the input element. Accordingly, a relation between the rotational speed Nc of the carrier 55 and the rotational speed Ns of the sun gear 52 with respect to a rotational speed Nr of the ring gear 53 as the input element can be expressed by the flowing expression (4):

$$Nc = (-\rho/(1-\rho)) \cdot Ns.$$

Given that the gear ratio $\rho$ is greater than 0.5, the rotational speed Nc of the carrier 55 is increased higher than the rotational speed Ns of the sun gear 52 as expressed as Nc>Ns. Likewise, a torque Ts of the sun gear 52 and a torque Tc of the carrier 55 can be expressed by the flowing expression (5):

$$Ts = (\rho/(\rho-1)) \cdot Tc.$$

Thus, given that the gear ratio $\rho$ is greater than 0.5, the rotational speed Nc of the carrier 55 is increased higher than the rotational speed Ns of the sun gear 52. According to the sixth embodiment, therefore, the inertia torque of the carrier 55 may also be increased.

When the lockup clutch 23 is engaged, torque of the engine 59 is applied to the lockup damper 69. In this situation, a reaction of torque rotating the transmission 66 is applied to the ring gear 53. Consequently, the springs 72 of the lockup damper 69 are compressed by a relative rotation between the drive member 70 and the driven member 71, thereby causing a relative rotation between the sun gear 52 and the ring gear 53 at a predetermined angle. In this situation, if the torque of the engine 59 is stable without causing pulsation, the planetary unit 67 is rotated integrally while maintaining such relative rotation between the sun gear 52 and the ring gear 53.

When pulsation of the torque of the engine 59 occurs, a compressive force compressing the springs 72 is changed thereby vibrating the sun gear 52 and the ring gear 53 being rotated relatively to each other. Consequently, the first pinion gears 54 and the second pinion gears 68 are oscillated within a predetermined angle thereby vibrating the carrier 55 in the rotational direction. As described, the inertia torque is generated in accordance with a total mass of the carrier 55 and the inertial mass 58 and a rotational angular velocity thereof. In addition, given that the gear ratio $\rho$ is greater than 0.5, the rotational speed Nc of the carrier 55 is increased higher than the rotational speed Nr of the ring gear 53 so that the inertia torque of the carrier 55 can be increased. Consequently, pulsation of the input torque is absorbed by the inertial torque of the carrier 55 to suppress vibrations on the input shaft of the transmission 66.

In addition, according to the sixth embodiment, the inertial mass 58 integrated with the carrier 55 is situated between the first connection member 73 and the lockup damper 69. According to the sixth embodiment, therefore, the spiral flow of the oil from the pump impeller 10 to the carrier 55 may also be blocked by the lockup damper 69 and the first connection member 73. For this reason, the carrier 55 may also be allowed to rotate smoothly to further enhance the vibration damping performance of the planetary unit 67.

Figure 7:
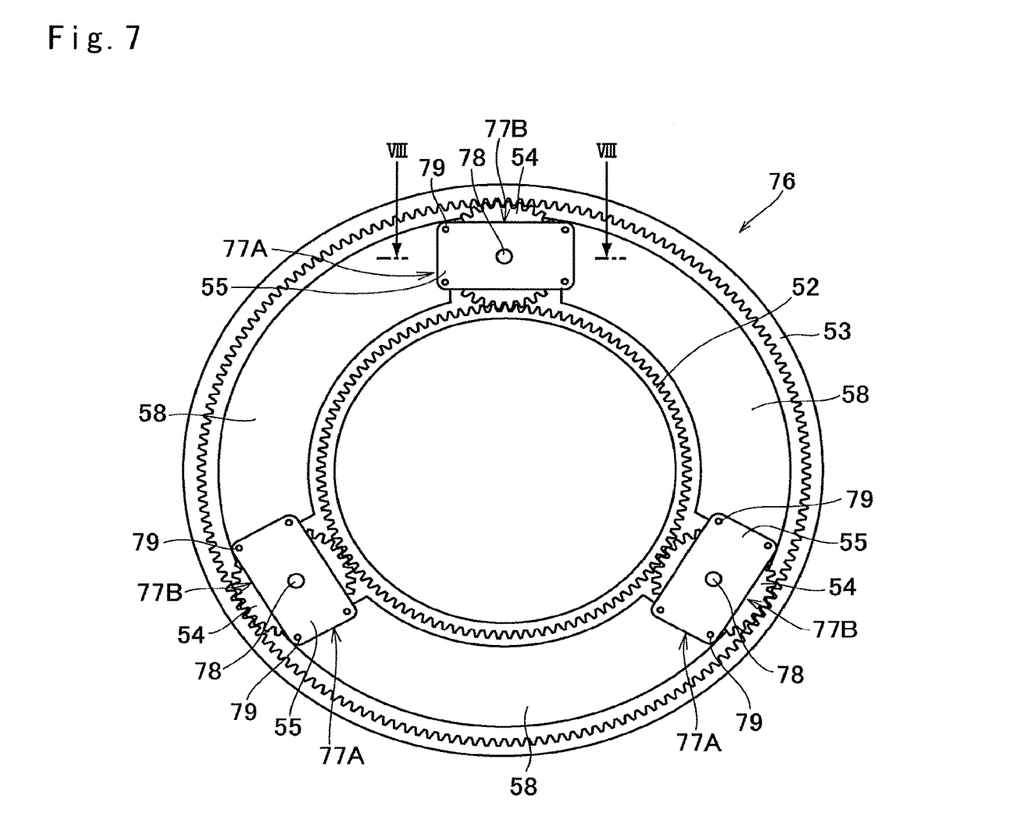
FIG. 7 is a front view schematically showing another example of the single-pinion planetary unit.
Figure 8:
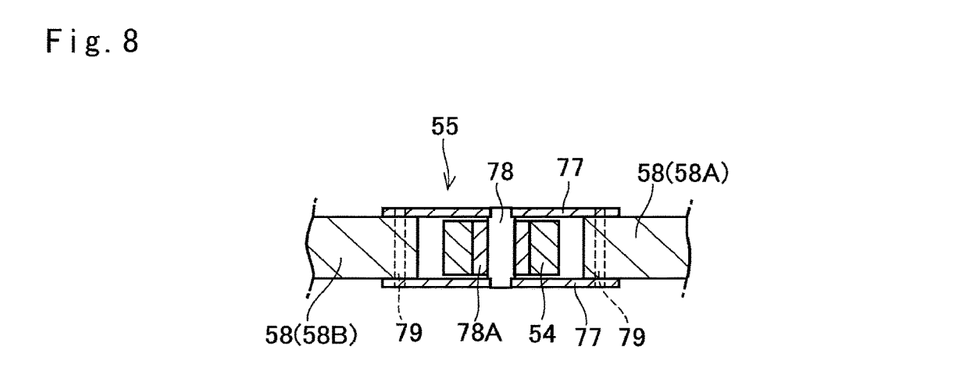
FIG. 8 is a partial cross-sectional view along the VIII-VIII line in FIG. 7.

Turning to FIG. 7, there is shown another example of the single-pinion planetary unit in which the inertial mass is arranged between the pinion gears, and FIG. 8 shows a cross-section of the single-pinion planetary unit along VIII-VIII line in FIG. 7. A planetary unit 76 shown in FIG. 7 comprises the sun gear 52, the ring gear 53 formed concentrically around the sun gear 52, the pinion gears 54 interposed between the sun gear 52 and the ring gear 53, and the carrier 55 supporting the pinion gears 54 in a rotatable manner. As illustrated in FIG. 8, the carrier 55 includes a pair of first supporting members 77 covering the pinion gear 54 from both sides, and a pinion pin 78 connecting the first supporting members 77 while supporting the pinion gear 54 in a rotatable manner through a first needle bearing 78A. Specifically, each of the first supporting member 77 is a rectangular plate member in which every corner is rounded. A first side 77A as a short side of the first supporting member 77 is shorter than a pitch circle diameter of the pinion gear 54, and a second side 77B as a long side of the first supporting member 77 is longer than the pitch circle diameter of the pinion gear 54. The pinion pin 78 penetrates through the pinion gear 54 at the center of the first supporting members 77. According to the example shown in FIG. 7, three pinion gears 54 are arranged in a circular manner around the sun gear 52 at regular interval while being supported by the carrier 55.

In the planetary unit 76 shown in FIG. 7, the inertial mass 58 is arranged in each clearance between the pinion gears 54. In other words, the adjacent pinion gears 54 are connected to each other through the inertial mass 58. That is, in the planetary unit 76, the carrier 55 is formed by three pairs of the first supporting members 77 and three inertial masses 58. According to the example shown in FIG. 7, specifically, each of the inertial mass 58 is an arcuate plate member extending between addendum circles of the sun gear 52 and the ring gear 53. A thickness of each of the inertial mass 58 in the axial direction is substantially identical to a clearance between the pair of first supporting members 77, and a width of each of the inertial mass 58 in the radial direction is slightly shorter than a clearance between addendum circles of the sun gear 52 and the ring gear 53. As illustrated in FIG. 8, one of end portions 58A of the inertial mass 58 is inserted into the clearance between the pair of first supporting members 77 from one side while keeping a predetermined distance from the pinion gear 54, and fixed to the first supporting members 77 by pins 79 penetrating through the inertial mass 58 in the thickness direction at each corner of one side of the first supporting members 77. Likewise, the other end portion 58B of the inertial mass 58 is also inserted into the clearance between the pair of first supporting members 77 from the other side while keeping a predetermined distance from the pinion gear 54, and fixed to the first supporting members 77 by the pins 79 at each corner of the other side of the first supporting members 77.

Thus, in the planetary unit 76 shown in FIGS. 7 and 8, each of the pinion gear 54 is individually supported by the pair of first supporting members 77. According to the example shown in FIGS. 7 and 8, therefore, the carrier 55 may be downsized. Since the first supporting member 77 is not formed entirely around the sun gear 52, a manufacturing cost of the carrier 55 may also be reduced. In addition, in the planetary unit 76, each of the inertial mass 58 is disposed between the pinion gears 54. That is, the inertial masses 58 are situated concentrically with the sun gear 52, the ring gear 53 and the carrier 55. For this reason, the planetary unit 76 may be downsized in the axial direction. That is, the torque converter 1 according to the foregoing embodiments may be further downsized in the axial direction by using the planetary unit 76.

Figure 9:
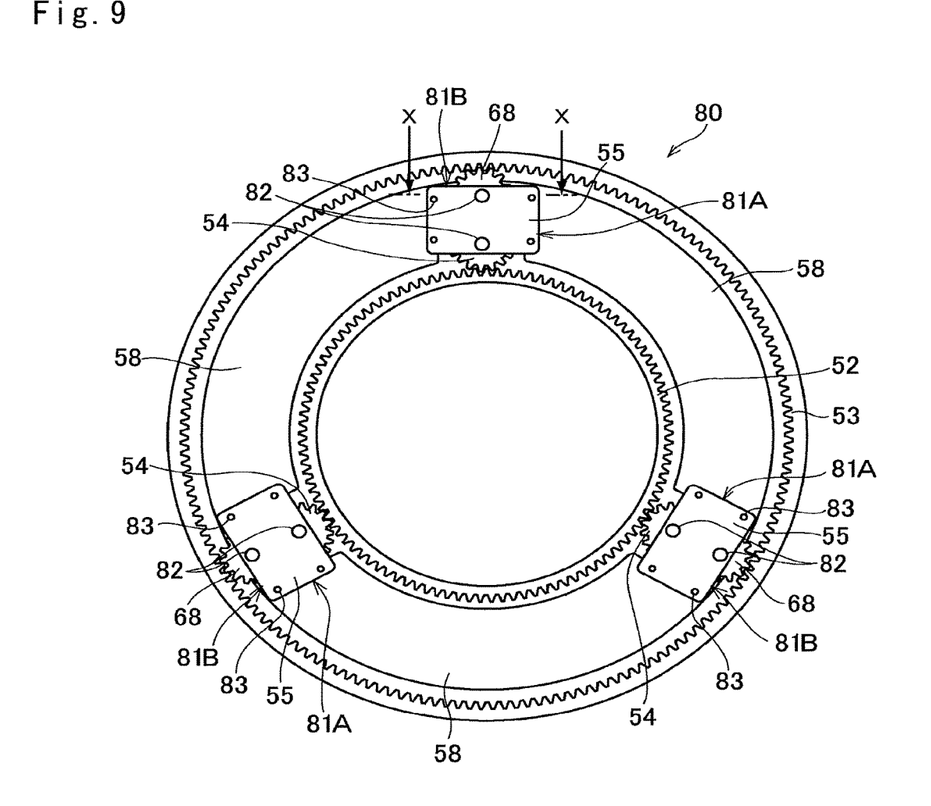
FIG. 9 is a front view schematically showing another example of the double-pinion planetary unit.
Figure 10:
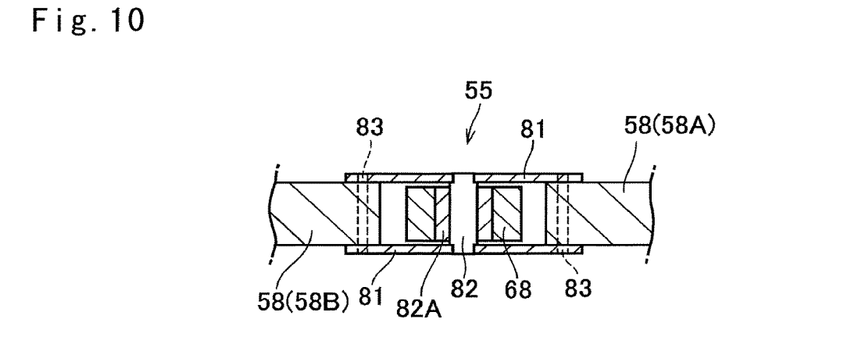
FIG. 10 is a partial cross-sectional view along the X-X line in FIG. 9.

Turning to FIG. 9, there is shown another example of the double-pinion planetary unit in which the inertial mass is arranged between the pinion gears, and FIG. 10 shows a cross-section of the double-pinion planetary unit along X-X line in FIG. 9. A planetary unit 80 shown in FIG. 9 comprises the sun gear 52, the ring gear 53 formed concentrically around the sun gear 52, the first pinion gears 54 meshed with the sun gear 52, the second pinion gears 68 interposed between the first pinion gears 54 and the ring gear 53, and the carrier 55 supporting the first pinion gears 54 and the second pinion gears 68 in a rotatable manner. That is, the first pinion gears 54 and the second pinion gears 68 are arranged concentrically with each other.

As illustrated in FIG. 9, the carrier 55 includes a pair of second supporting members 81 covering the first pinion gear 54 and the second pinion gear 68 from both sides, and second pinion pins 82 connecting the second supporting members 81 while supporting the first pinion gear 54 and the second pinion gear 68 in a rotatable manner through a second needle bearing 82A. Specifically, each of the second supporting member 81 is also a rectangular plate member in which every corner is rounded. A first side 81A as a short side of the second supporting member 81 is shorter than a total length of pitch circle diameters of the first pinion gear 54 and the second pinion gear 68, and a second side 81B as a long side of the second supporting member 81 is longer than a pitch circle diameter of each the first pinion gear 54 and the second pinion gear 68. The second pinion pins 82 penetrates through the first pinion gear 54 and the second pinion gear 68 at the width center of the second supporting members 81. According to the example shown in FIG. 9, three first pinion gears 54 and three second pinion gears 68 are arranged in a circular manner around the sun gear 52 at regular interval while being supported by the carrier 55.

In the planetary unit 80 shown in FIG. 9, the inertial mass 58 is arranged in each clearance between adjacent pairs of the second supporting members 81 to connect the adjacent pairs of the second supporting members 81. That is, in the planetary unit 80, the carrier 55 is also formed by three pairs of the second supporting members 81 and three inertial masses 58. According to the example shown in FIG. 9, specifically, each of the inertial mass 58 is also an arcuate plate member extending between addendum circles of the sun gear 52 and the ring gear 53. A thickness of each of the inertial mass 58 in the axial direction is substantially identical to a clearance between the pair of second supporting members 81, and a width of each of the inertial mass 58 in the radial direction is slightly shorter than a clearance between addendum circles of the sun gear 52 and the ring gear 53. As illustrated in FIG. 10, one of end portions 58A of the inertial mass 58 is inserted into the clearance between the pair of second supporting members 81 from one side while keeping a predetermined distance from the first pinion gear 54 and the second pinion gear 68, and fixed to the second supporting members 81 by pins 83 penetrating through the inertial mass 58 in the thickness direction at each corner of one side of the second supporting member 81. Likewise, the other end portion 58B of the inertial mass 58 is also inserted into the clearance between the pair of second supporting members 81 from the other side while keeping a predetermined distance from the first pinion gear 54 and the second pinion gear 68, and fixed to the second supporting members 81 by the pins 83 at each corner of the other side of the second supporting members 81.

Thus, in the planetary unit 80 shown in FIGS. 9 and 10, each of the first pinion gear 54 and the second pinion gear 68 is individually supported by the pair of second supporting members 81. According to the example shown in FIGS. 9 and 10, therefore, the carrier 55 may also be downsized. Since the second supporting member 81 is not formed entirely around the sun gear 52, a manufacturing cost of the carrier 55 may also be reduced. In addition, in the planetary unit 80, each of the inertial mass 58 is disposed between pairs of the second supporting members 81. That is, the inertial masses 58 are situated concentrically with the sun gear 52, the ring gear 53 and the carrier 55. For this reason, the planetary unit 80 may be downsized in the axial direction. That is, the torque converter 1 according to the foregoing embodiments may be further downsized in the axial direction by using the planetary unit 80.

In addition, since the sun gear 52 serves as the input element and the ring gear 53 serves as the output element of the planetary unit 80, a rotational speed of the carrier 55 may be increased higher than that of the ring gear 53. In the planetary unit 80, therefore, the inertia torque of the carrier 55 may be increased to further enhance the vibration damping performance. Instead, in the case of using the ring gear 53 as an input element, a rotational speed of the carrier 55 may be increased higher than that of the sun gear 52 by setting the gear ratio ρ greater than 0.5 to further enhance the vibration damping performance of the planetary unit 80.

Although the above exemplary embodiments of the present invention have been described, it will be understood by those skilled in the art that the present invention should not be limited to the described exemplary embodiments, but that various changes and modifications can be made within the spirit and scope of the present invention. For example, rollers may be used as the rotary elements of the planetary unit instead of the gears. In addition, the planetary unit may also be used in a fluid coupling which does not have a torque multiplying function.

What is claimed is:

1. A torque converter, having a torsional vibration damping device comprising:

a housing in which an internal space thereof is kept to a liquid-tight condition;
a pump impeller that creates a spiral flow of fluid;
a turbine runner that is rotated by the spiral flow of the fluid;
a lockup clutch that is engaged to transmit torque between the housing and the turbine runner;
an elastic damper that transmits the torque delivered from the lockup clutch to a drive member to a driven member through an elastic member; and
a planetary unit serving as the torsional vibration damping device, in which a first rotary element serves as an input element, a second rotary element serves as an output element, and a third rotary element is vibrated in a rotational direction by a pulsation of the torque transmitted between the first rotary element and the second rotary element,
wherein the pump impeller, the turbine runner, the lockup clutch, the elastic damper, and the planetary unit are held in the housing,
the torsional vibration damping device is arranged concentrically with the lockup clutch;
the input element is arranged concentrically with the lockup clutch while being connected to the lockup clutch and the drive member in a torque transmittable manner; and
the output element is connected to the driven member.

2. The torque converter having a torsional vibration damping device as claimed in claim 1, wherein the lockup clutch is situated in an inner circumferential side of the torsional vibration damping device.

3. The torque converter having a torsional vibration damping device as claimed in claim 1, wherein the lockup clutch is situated in an outer circumferential side of the torsional vibration damping device.

4. The torque converter having a torsional vibration damping device as claimed in claim 1, wherein the elastic damper is situated between the torsional vibration damping device and the turbine runner in the axial direction.

5. The torque converter having a torsional vibration damping device as claimed in claim 1, wherein the lockup clutch includes a plurality of first friction plates connected to the housing, a plurality of second friction plates connected to the turbine runner, and an actuator that engages the first friction plates with the second friction plates to enable torque transmission between the housing and the turbine runner.

6. The torque converter having a torsional vibration damping device as claimed in claim 5, wherein the actuator is situated in tandem with the first friction plates and the second friction plates in the axial direction.

7. The torque converter having a torsional vibration damping device as claimed in claim 1, wherein:
the planetary unit includes a single-pinion planetary gear unit comprising a sun gear, a ring gear arrange concentrically with the sun gear, a plurality of first pinion gears interposed between the sun gear and the ring gear, and a carrier supporting the first pinion gears,
the ring gear serves as any one of the input element and the output element,
any one of the sun gear and the carrier serves as the other of the input element and the output element, and
the other of the sun gear and the carrier is vibrated in a rotational direction by a pulsation of the torque transmitted between the input element and the output element.

8. The torque converter having a torsional vibration damping device as claimed in claim 7, wherein:
the ring gear serves as the output element,
the sun gear serves as the input element,
the carrier is vibrated in the rotational direction by a pulsation of the torque transmitted between the sun gear and the ring gear, and
the carrier includes a plurality of pairs of first supporting members individually holding the first pinion gear, and a plurality of masses interposed between the sun gear and the ring gear to individually connect the adjacent pairs of first supporting members.

9. The torque converter having a torsional vibration damping device as claimed in claim 7, wherein:
the ring gear serves as the input element,
the sun gear serves as the output element,
the carrier is vibrated in the rotational direction by a pulsation of the torque transmitted between the sun gear and the ring gear, and
the carrier includes a plurality of pairs of first supporting members individually holding the first pinion gear, and a plurality of masses interposed between the sun gear and the ring gear to individually connect the adjacent pairs of first supporting members.

10. The torque converter having a torsional vibration damping device as claimed in claim 1, wherein:
the planetary unit includes a double-pinion planetary gear unit comprising a sun gear, a ring gear arrange concentrically with the sun gear, a plurality of first pinion gears meshing with the sun gear, a plurality of second pinion gears interposed between the first pinion gears and the ring gear, and a carrier supporting the first pinion gears and the second pinion gears,
any one of the sun gear and the ring gear serves as the input element,
the other of the sun gear and the ring gear serves as the output element, and
the carrier is vibrated in a rotational direction by a pulsation of the torque transmitted between the input element and the output element.

11. The torque converter having a torsional vibration damping device as claimed in claim 10, wherein the carrier includes a plurality of pairs of second supporting members individually holding the first pinion gear and the second pinion gears, and a plurality of masses interposed between the sun gear and the ring gear to individually connect the adjacent pairs of second supporting members.

12. A torque converter, having a torsional vibration damping device comprising:
a housing in which an internal space thereof is kept to a liquid-tight condition;
a pump impeller that creates a spiral flow of fluid;
a turbine runner that is rotated by the spiral flow of the fluid;
a lockup clutch that is engaged to transmit torque between the housing and the turbine runner;
an elastic damper that transmits the torque delivered from the lockup clutch to a drive member to a driven member through an elastic member; and
a planetary unit serving as the torsional vibration damping device, in which a first rotary element serves as an input element, a second rotary element serves as an output element, and a third rotary element is vibrated in a rotational direction by a pulsation of the torque transmitted between the first rotary element and the second rotary element, wherein the pump impeller, the turbine runner, the lockup clutch, the elastic damper, and the planetary unit are held in the housing, the torsional vibration damping device is arranged concentrically with the lockup clutch;

the lockup clutch is connected to the input element through a connection member in a torque transmittable manner between the housing and the torsional vibration damping device in an axial direction; and the output element is connected to the driven member in a torque transmittable manner.

13. The torque converter having a torsional vibration damping device as claimed in claim 12, wherein the lockup clutch is situated in an inner circumferential side of the torsional vibration damping device.

14. The torque converter having a torsional vibration damping device as claimed in claim 12, wherein the elastic damper is situated between the torsional vibration damping device and the turbine runner in the axial direction.

15. The torque converter having a torsional vibration damping device as claimed in claim 12, wherein the lockup clutch includes a plurality of first friction plates connected to the housing, a plurality of second friction plates connected to the turbine runner, and an actuator that engages the first friction plates with the second friction plates to enable torque transmission between the housing and the turbine runner.

16. The torque converter having a torsional vibration damping device as claimed in claim 15, wherein the actuator is situated in tandem with the first friction plates and the second friction plates in the axial direction.

17. The torque converter having a torsional vibration damping device as claimed in claim 12, wherein:

the planetary unit includes a single-pinion planetary gear unit comprising a sun gear, a ring gear arrange concentrically with the sun gear, a plurality of first pinion gears interposed between the sun gear and the ring gear, and a carrier supporting the first pinion gears, the ring gear serves as any one of the input element and the output element, any one of the sun gear and the carrier serves as the other of the input element and the output element, and the other of the sun gear and the carrier is vibrated in a rotational direction by a pulsation of the torque transmitted between the input element and the output element.

18. The torque converter having a torsional vibration damping device as claimed in claim 17, wherein:

the ring gear serves as the output element, the sun gear serves as the input element, the carrier is vibrated in the rotational direction by a pulsation of the torque transmitted between the sun gear and the ring gear, and the carrier includes a plurality of pairs of first supporting members individually holding the first pinion gear, and a plurality of masses interposed between the sun gear and the ring gear to individually connect the adjacent pairs of first supporting members.

19. The torque converter having a torsional vibration damping device as claimed in claim 17, wherein:

the ring gear serves as the input element, the sun gear serves as the output element, the carrier is vibrated in the rotational direction by a pulsation of the torque transmitted between the sun gear and the ring gear, and the carrier includes a plurality of pairs of first supporting members individually holding the first pinion gear, and a plurality of masses interposed between the sun gear and the ring gear to individually connect the adjacent pairs of first supporting members.

20. The torque converter having a torsional vibration damping device as claimed in claim 12, wherein:

the planetary unit includes a double-pinion planetary gear unit comprising a sun gear, a ring gear arrange concentrically with the sun gear, a plurality of first pinion gears meshing with the sun gear, a plurality of second pinion gears interposed between the first pinion gears and the ring gear, and a carrier supporting the first pinion gears and the second pinion gears, any one of the sun gear and the ring gear serves as the input element, the other of the sun gear and the ring gear serves as the output element, and the carrier is vibrated in a rotational direction by a pulsation of the torque transmitted between the input element and the output element.

21. The torque converter having a torsional vibration damping device as claimed in claim 20, wherein the carrier includes a plurality of pairs of second supporting members individually holding the first pinion gear and the second pinion gears, and a plurality of masses interposed between the sun gear and the ring gear to individually connect the adjacent pairs of second supporting members.

* * * * *